United States Patent [19]

Kice et al.

[11] Patent Number: 5,167,471
[45] Date of Patent: Dec. 1, 1992

[54] ANTI-CHOKE BLENDER FITTING

[75] Inventors: John E. Kice, Wichita; Gordon J. Peters, Hesston, both of Kans.

[73] Assignee: Kice Industries, Inc., Wichita, Kans.

[21] Appl. No.: 793,204

[22] Filed: Nov. 18, 1991

[51] Int. Cl.⁵ ............................................. B65G 53/24
[52] U.S. Cl. ..................................... 406/122; 406/93; 406/151; 406/192
[58] Field of Search ................. 406/151, 107, 122, 93, 406/192; 137/527.8, 895; 251/303

[56] References Cited

U.S. PATENT DOCUMENTS

| | | | |
|---|---|---|---|
| 2,644,722 | 7/1953 | Childress | 406/151 |
| 2,649,339 | 8/1953 | Schaetzel et al. | 406/122 |
| 3,198,584 | 8/1965 | Kice et al. | 406/151 X |
| 3,307,576 | 3/1967 | Himes et al. | 406/192 X |
| 3,318,327 | 5/1967 | Himes et al. | 406/192 X |

FOREIGN PATENT DOCUMENTS 1124755 10/1956 France ............................. 406/122
1161697 8/1969 United Kingdom .............. 406/93

Primary Examiner—Margaret A. Focarino
Assistant Examiner—James M. Kannofsky
Attorney, Agent, or Firm—Edward L. Brown, Jr.

[57] ABSTRACT

An anti-choke blender fitting used in a pneumatic conveyor system utilizing a negative pressure to transport milling stock material, the fitting including a body with a top surface joined by downwardly extending side walls terminating in an open bottom with a channel-shaped relief gate with upwardly extending side walls hingedly mounted to the body with a closed position of the relief gate closing the open bottom of the body in a non air-tight relationship with the side walls of the gate extending above the spout of the inlet conduit, thereby minimizing the leakage of milling stock around the periphery of the relief gate in its closed position.

8 Claims, 2 Drawing Sheets

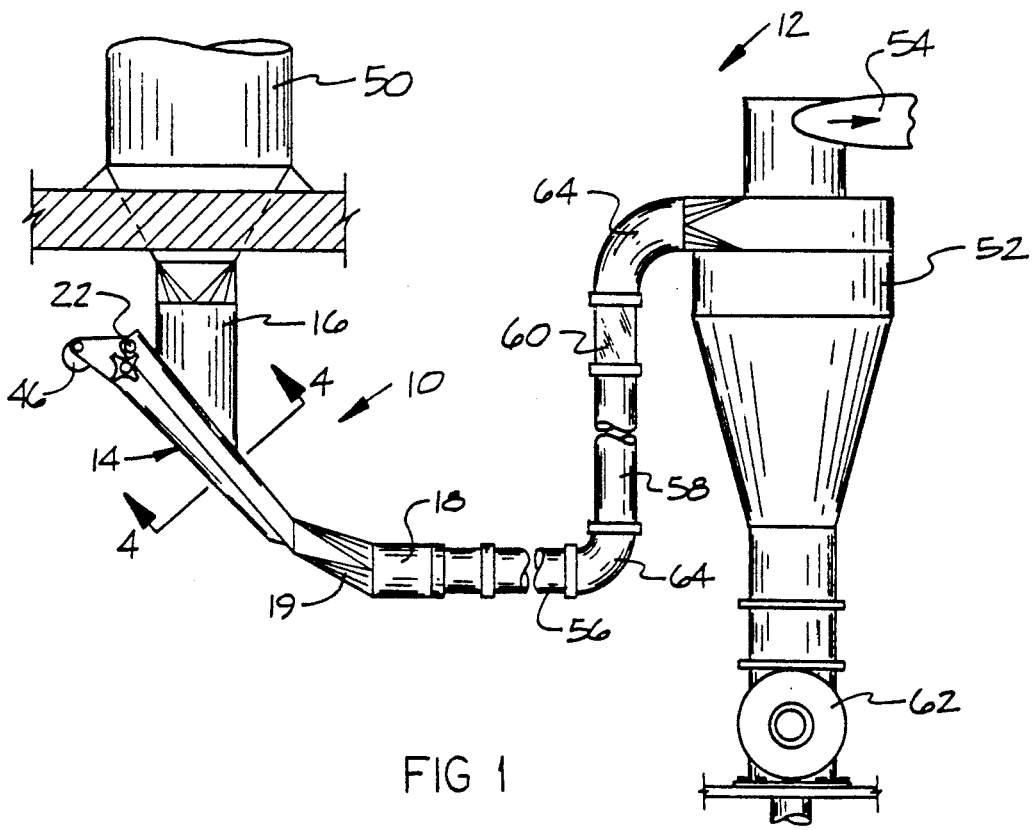
FIG 1
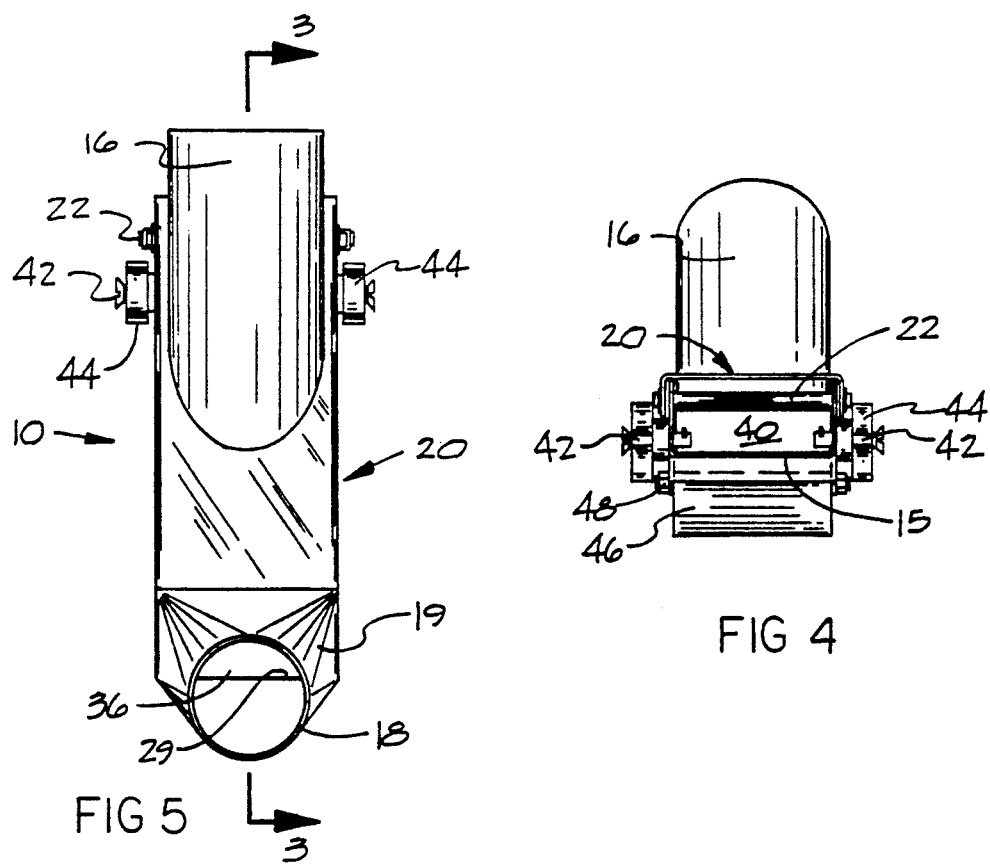
FIG 5
FIG 4

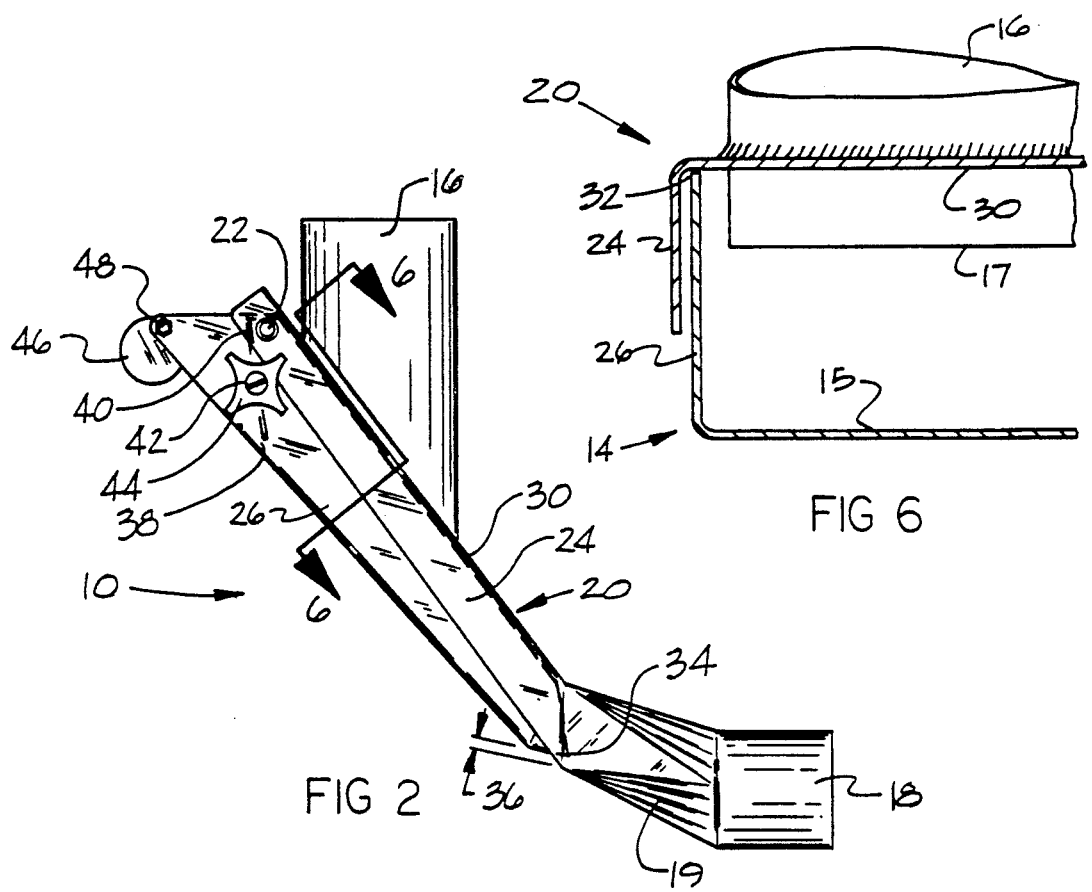
FIG 2
FIG 6
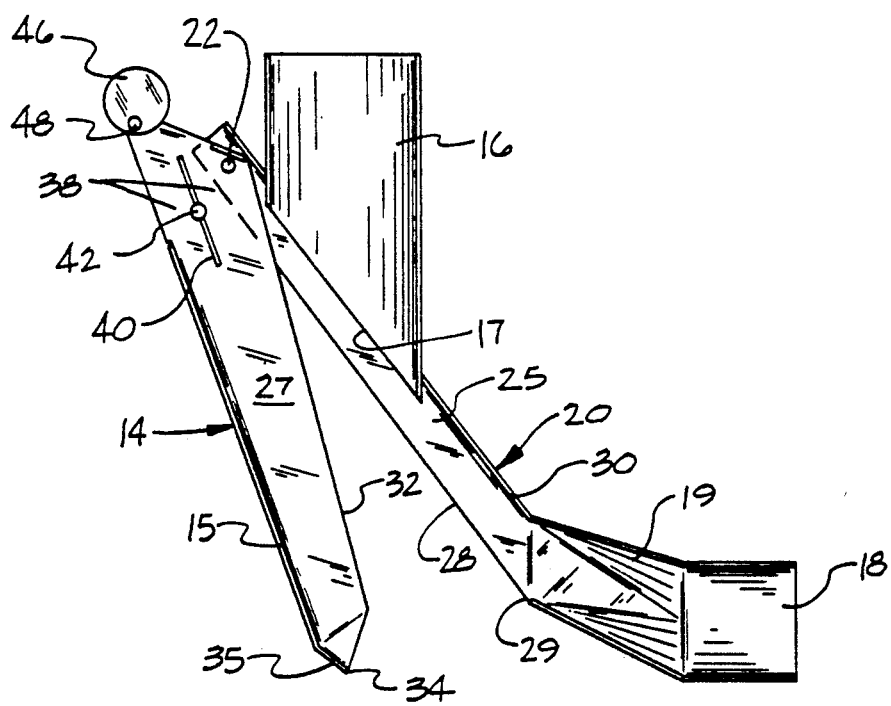
FIG 3

ANTI-CHOKE BLENDER FITTING

BACKGROUND OF THE INVENTION

The invention relates to pneumatic conveying and more specifically to conveying milled materials such as flour from one point to another by means of negative pressure. The invention, which is a blender fitting, is utilized in pneumatic conveying systems for blending high volumes of suction air with the milled stock as a means of conveying the milled stock from one location to another. Blender fittings also have the function of an overload release means, also referred to as an anti-choke dump valve, which automatically releases the milled material in the system when it chokes or clogs.

DESCRIPTION OF THE PRIOR ART

Blender fittings of the prior art generally perform these functions. They have been available in the pneumatic conveying industry for many years and a typical example is applicant's own U.S. Pat. No. 3,198,584. There are also two blender fittings currently on the market, one of which is manufactured by the Henry Simon, Ltd. Company of Cheshire, England, and the second being a Swiss company by the name of Buhler. The basic problem which all of the above-mentioned blender fittings have, and the present invention has resolved, is the elimination of mill stock leakage around the joints of the relief gate. This leakage of milling stock, which takes place through joints in the fitting, is at a slow rate; however, in time it creates a substantial build-up on the floors and must be eventually dealt with.

Conveying milled materials such as flour from one point to another is best done by a negative pressure pneumatic conveying system since it is the most sanitary way of transporting a solid product. This is because all of the components of the system are in a negative pressure condition. Negative pressure in pneumatic systems of this type are well known in the art. The main components of such a system include a vacuum producer in the form of a centrifugal fan which draws the milled material from a source which could be grinding or sifting apparatus or merely a storage bin. Typically the storage bin feeds the material to be conveyed into the inlet conduit of a blender fitting for transmission. The material is then transmitted through the tubes of the system by the flow of large amounts of air induced or sucked into the blender fitting. Once the material is transported to its final location, a device such as a cyclone separator will separate the material from the negative pressure air for deposit in a storage bin. The suction means is provided by a centrifugal fan or the like which is connected to the cyclone separator. The milling stock materials thus are transported through the system in a stream of high velocity air which is allowed into the system through a blender fitting, such as the present invention. The milling stock is blended with the high velocity air stream, transmitting the product to its destination, whereupon the product and air are separated.

One of the major problems with pneumatic conveyers involves the stoppage or clogging of the conduits due to a variety of factors. If the milled material is fed at a too rapid rate, the system will clog, whereupon all flow ceases and the suction is lost. The conveying capacity rate of systems varies with factors such as moisture content of the material being conveyed, the atmospheric pressure, humidity, particle size and irregular product flow, as well as many other factors. Clogging can also occur with the momentary drop in air pressure within the system. This could be caused from a variety of reasons, including power failure or flow variations in the system. When pneumatic systems of this type become clogged or choked, the function of the blender fitting is to automatically dump the clogged material which has collected in the blender. Due to the weight of the clogged material, along with the lack of suction in the system, the relief gate will automatically open and dump all of the clogged milling stock in the blender and upstream thereof to the ground. Without the weight of the milling stock, the gate is so counterweighted that it will again close once the material has been dumped and the suction in the system will return since the point of clogging has now been removed.

SUMMARY OF THE PRESENT INVENTION

The blender fitting of the present invention eliminates this gradual leakage problem of the prior art blenders. This is accomplished by providing a channel-shaped relief gate which has side walls which substantially overlap with the side walls of the blender body to the extent that the inlet spout of milled material entering the blender body is below the upper edge of the relief gate side walls, thereby preventing any leakage in a relatively loose fitting negative pressure design. Another method of solving this leakage problem is to create an air-tight machined joint between the edges of the relief gate and the blender body, such as taught in the above mentioned Buhler blender. From a cost standpoint, precision made parts with machine edges cost substantially more to produce than the less expensive sheet metal design of the present invention. Applicant's blender body and relief gate are both constructed of fabricated steel sheet with a loose tolerance fit therebetween. In U.S. Pat. No. 3,198,584, the butt joint between door 28 and the edge of the blender body allows leakage whenever the pressure fluctuates. In the relief gate of the present invention, the product leakage is eliminated since the inlet spout enters below the side walls of the relief gate. The relief gate of the present invention also has a very compact, eccentric counterweight means which is adjustable to keep the gate closed under normal operating conditions and yet opens in the event of a clogging. When a conveying line is choked or an overload condition arises, the relief gate opens, dumping the milling stock until the line purges itself and is unplugged. The counterweight then returns the gate to the closed position. The positioning of the inlet conduit and spout directly over the relief gate prevents the stock from backing up at the spout, preceding the return of suction in the system. At the toe of the relief gate, there is a secondary fixed opening of air inlet which improves acceleration and lift of the product passing into the conveying line immediately downstream.

Located at the upper end or heel of the relief gate is an adjustable butterfly valve which adjusts the amount of inlet air for equipment preceding the blender, such as rollstands, sifters, or purifiers, since each of these require varying amounts of air flow. Closing the valve diverts air to the equipment. This adjustable air inlet opening provides for improved acceleration of the milled product across the gate and therefore decreases the pressure drop across the entire blender fitting.

Therefore, the principal object of the present invention is to provide a blender fitting which eliminates product leakage with a design which is simple and inexpensive to build, while providing an improved performance over the blender fittings of the prior art.

Another object of the present invention is to provide a blender fitting which localizes the area of blockage in a pneumatic system and is capable of automatically relieving and correcting said blockage.

Another object of the present invention is to provide a new blender fitting in a pneumatic system which provides improved air stream velocities therethrough to enhance its anti-clogging capability.

Other objects and advantages of the blender fitting will become apparent to those skilled in the art upon reading this disclosure.

DESCRIPTION OF THE DRAWINGS

FIG. 1 is an elevational view of a negative pressure pneumatic system including the blender fitting of the present invention;

FIG. 2 is a side elevational view of the blender fitting of the present invention with the relief gate in the closed position;

FIG. 3 is a side elevational view in section with the relief gate in the open position;

FIG. 4 is a sectional view taken along lines 4—4, FIG. 1;

FIG. 5 is a front elevational view of the blender fitting; and

FIG. 6 is a sectional view to an enlarged scale taken along line 6—6 of FIG. 2.

DESCRIPTION OF THE PREFERRED EMBODIMENT

Referring to the drawings, and specifically to FIG. 1, the negative pressure pneumatic system of the present invention is generally described by the reference numeral 12. The system 12 includes a vacuum producer in the form of a centrifugal fan or the like, not shown in the drawing, connected to vacuum suction conduit 54. The suction produced in the line 54 draws air through the entire pneumatic system 12 which enters the system through blender fitting 10, the subject matter of the present invention. The milled product, such as flour, is initially stored in storage bin 50 or processed in a machine, and falls by gravity into the blender fitting 10 through inlet conduit 16. Blender fitting 10, shown in detail in FIGS. 2 and 3, provides an opening in the negative pressure system for sucking in atmospheric air through a variable air gap of 38, as best seen in FIG. 3. A secondary fixed air gap 36 is provided at the end of the relief gate 14 as best seen in FIGS. 2 and 5. The vacuum placed on the system draws air through the last mentioned gaps 38 and 36 which produce a high velocity and volume of air for transporting the milled product entering inlet conduit 16 through the entire system 12. At the end of the system, just upstream of the vacuum source, is a cyclone type separator 52 which separates the mill product from the air. Cyclone separators, well known in the art, basically swirl the air with the entrained material in a circular motion, causing the heavier milled material to move outward against the wall and settle in the bottom of the separator, while the lighter air is evacuated through conduit 54. The transported milled product can be withdrawn from the bottom of separator 52 through a conventional airlock 62 by gravity flow.

The negative pressure pneumatic system 12 of the present invention is used in the various milling operations since it is the most sanitary way to transport a milled material. They will transport the milled material through various runs of the system 12, including horizontal sections 56, elbows 64, vertical sections 58 and sightglass 60, before entering a cyclone separator 52 at the end of the line. The blender fitting 10, located basically at the beginning of the pneumatic system, performs two important functions, the first being controlling the volume of air moving through the system, and the second being a dump valve when the system clogs. While in the trade this fitting 10 is referred to as a blender fitting, it might likewise be called a dump valve in light of its automatic dumping function when the blender becomes clogged with milled material. These blender fittings have also been referred to as an "accelerator", a "pickup shoe", or a pneumatic boot.

The blender valve 10 of the present invention includes a blender body 20 positioned in a generally inclined angle with a vertically positioned inlet conduit 16 which passes through the planar top surface 30 of the blender body, as seen in FIG. 3, and extends downward into the body 20, terminating in spout 17. The blender body 20 further includes a horizontally positioned outlet conduit 18 of lesser diameter than the inlet conduit connected to the body through a transition section 19 while the bottom 28 of the blender body is open. Positioned in the open bottom 28 is a relief gate 14 which is hingedly mounted by pivot pin 22 to the body 20 at its upper or heel end. Relief gate 14 is channel-shaped in cross-section with a bottom 15 and a pair of upwardly standing side walls 26 and 27. The side walls 26 and 27 have upper edges 32. The side walls 26 and 27 are tapered from their heel end of gate 14 toward the toe end 34 to provide a gradually decreasing interior cross-section area of the blender body, when the gate is in its closed position as seen in FIG. 2. The toe 34 of the relief gate 14 has a slightly upturned bottom portion 35, as best seen in FIG. 3, to slightly deflect the high velocity air and entrained product as it reaches the end of the gate and flows out conduit 18. Also adjacent the toe 34 of the gate is a fixed air gap 36 as seen in FIGS. 2 and 6. This secondary air gap 36 provides additional high velocity air which improves acceleration and lift of the product into the system. Located at the heel end of the relief gate 14 is a counterweight 46 releasably held by a bolt 48 which passes through both side walls 26 and 27. The counterweight 46 comprises an eccentrically mounted metal bar. By rotating counterweight 46 closer to or farther away from pivot pin 22, the closing moment on gate 14 can be adjusted for the particular application. Also positioned in the heel end of relief gate 14 is a damper means or damper valve 40 of the butterfly type which is rotatably mounted to the side walls 26 and 27 of the relief gate 14 on shafts 42 which in turn carry handles 44. Damper valve 40 has variable air gaps 38 on both sides thereof to regulate the amount of suction air which is transmitted into the system 12. Damper valve 40 can be adjustably positioned as illustrated in FIGS. 2 and 3 to vary the amount of air entering the system, depending upon the particular requirements of the system. With the gate 14 in its closed position, as best seen in FIG. 6, the spout 17 on the end of inlet conduit 16 extends below the upper edge 32 of the side wall 26 of the gate 14. The spout 17 extends below the upper edge 32 of the side wall 27 with the gate 14 in its closed position. With the gate 14 in the closed position the upper edges 32 of the side walls 26 and 27 are in close proximity with the top surface 30 of the blender body 20. This particular geometry avoids the gravity leakage which takes place in other blender valves during operation and shut-down times. The tolerance fit between the blender body 20 and the relief gate 14 is quite loose as can best be seen in FIG. 6 wherein the side wall 26 completely overlaps the blender body side wall 24. The side wall 27 overlaps the blender body side wall 25. This overlap joint along the sides of the gate prevent any gravity leakage which might otherwise occur. The toe 34 of the gate 14 in its closed position extends slightly past the lower edge 29 of the blender body 20. The side walls 26 and 27 of the relief gate 14 in the closed position are located inside the side walls 24 and 25 of the blender body 20.

OPERATION

The counterweight 48 on relief gate 14 is adjustably positioned so that the closing moment provided by the counterweight provides enough moment to swing the gate 14 back to its closed position as seen in FIG. 2. Once milled material begins to build up in gate 14, the additional weight, if there is no air suction across the gate, would be adequate to swing the gate to its open position, as shown in FIG. 3, and dump the milled material collected both in gate 14 and inlet conduit 16. Once the milled material is fully dumped, the action of counterweight 46 will swing the gate 14 in a counter clockwise direction, as seen in FIG. 2, to its closed position.

The amount of air passing through the pneumatic system 12 can be adjusted by damper valve 40. For example, if an increased amount of milled material is desired to be moved through the system, the air flow through the system can be increased and the damper valve 40 opened wider. One of major problems in pneumatic systems of the present type involves clogging of the conduits with the material being conveyed. This is caused by various factors such as moisture content of the milled material, atmospheric pressure, humidity, particle size, irregular product flow, as well as other factors. Clogging also is effected by drops in negative pressure within the system which can be caused by a variety of reasons, including the opening and closing of various valves in the system. The system 12 is designed so that clogging will first take place in the horizontal pipe 56 and in the blender fitting 10 as the interior of blender body 20 begins to clog and fill the interior of the body. As this happens, the air flow ceases and the suction effect holding the gate 14 closed is lost and the weight of the milled material in gate 14 backed up in conduit 16 overcomes counterweight 46 and swings gate 14 to the open position as seen in FIG. 3. This dumps all of the milled material backed up in the blender and inlet conduit 16, and once it is fully dumped, gate 14 will swing back to its closed position of FIG. 2 due to the counter clockwise moment of counterweight 46 and increased negative pressure acting on the gate 14. With the blender valve now unclogged, the system 12 is again ready to draw milled product through conduit 16 and air through gaps 38 and 36 as the system returns to its normal operating condition.

While the invention has been described with a certain degree of particularity, it is manifest that many changes can be made in the details of construction and the changing of certain components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. An anti-choke blender fitting for use in pneumatic conveyor systems utilizing negative pressure to transport milling stock materials comprising:

a blender body having a top surface, a lower end, an upper end, and downwardly extending side walls terminating in an open bottom, an outlet conduit, an inlet conduit with a spout extending inside the body;

a channel-shaped relief gate having upwardly extending side walls with upper edges, the relief gate being hingedly mounted at an upper end to the blender body with a closed position of the gate closing the bottom of the body in a non-airtight relationship, the gate having an open position which will dump any of said milling stock collected in the gate due to the action of gravity;

a counterweight means attached to the relief gate which returns the gate to its closed position when empty;

an adjustable damper means in the blender fitting which allows outside air to be drawn into the blender body to transport said milling stock through the conveyor system; and the side walls of the gate and side walls of the blender body overlap in the closed position whereby the spout of the inlet conduit extends below the upper edges of the side walls of the gate thereby minimizing the leakage of said milling stock around the periphery of the relief gate in its closed position.

2. An anti-choke blender fitting as set forth in claim 1, wherein the side walls of the relief gate in the closed position, are located inside the side walls of the blender body and substantially overlap the side walls of the blender body.

3. An anti-choke blender fitting as set forth in claim 1, wherein the top surface of the blender body is a planar surface joining its side walls, and the side walls of the relief gate, in its closed position, are positioned inside the blender body with the upper edges in close proximity with the top surface of the blender body.

4. An anti-choke blender fitting as set forth in claim 1, wherein the blender body is positioned in a generally inclined angle with the inlet conduit vertically positioned at the upper end of the body and the outlet conduit horizontally positioned at the lower end of the body through a transition section, the damper means being positioned at the hinged end of the gate thereby providing incoming air flow across the relief gate and out the outlet conduit with the transported milling stock.

5. An anti-choke blender fitting as set forth in claim 1, wherein the blender body is positioned in a generally inclined angle with the inlet conduit vertically positioned at the upper end of the body and the outlet conduit horizontally positioned at the lower end of the body through a transition section, the damper means being positioned at the hinged end of the gate thereby providing incoming air flow across the relief gate, a toe end of the relief gate including an upturned portion to redirect the flowing air and milling stock out of the horizontally positioned outlet conduit.

6. An anti-choke blender fitting as set forth in claim 1, wherein the blender body is positioned in a generally inclined angle with the inlet conduit vertically positioned at the upper end of the body and the outlet, conduit horizontally positioned at the lower end of the body through a transition section, the damper means being positioned at the hinged end of the gate thereby providing incoming air flow across the relief gate, a toe end of the relief gate including an upturned portion to redirect the flow air and milling stock out of the horizontally positioned outlet conduit, a secondary air inlet gap means between the toe end of the relief gate and the blender body allowing additional tangential air to enter the blender fitting and provide additional overlap of gate to body, to reduce chance of milling stock leakage.

7. An anti-choke blender fitting as set forth in claim 1, wherein the counterweight means comprises an eccentrically mounted metal bar positioned between the side walls of the relief gate approximate its upper end which is rotatable to adjust the closing moment on the gate.

8. An anti-choke blender fitting as set forth in claim 1, wherein the damper means is a butterfly valve rotatably mounted to the side walls of the relief gate approximate its upper end which can be adjustably positioned to vary the incoming air.

* * * * *